United States Patent
Kuwashima et al.

(10) Patent No.: US 7,587,550 B2
(45) Date of Patent: Sep. 8, 2009

(54) FUNCTIONAL TEST METHOD AND FUNCTIONAL TEST APPARATUS FOR DATA STORAGE DEVICES

(75) Inventors: Masaki Kuwashima, Kanagawa (JP); Nobuo Takeda, Kanagawa (JP); Masashi Tsuyama, Kanagawa (JP); Satoshi Takahashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 399 days.

(21) Appl. No.: 11/544,914

(22) Filed: Oct. 5, 2006

(65) Prior Publication Data
US 2007/0083705 A1 Apr. 12, 2007

(30) Foreign Application Priority Data
Oct. 7, 2005 (JP) ............................. 2005-294305

(51) Int. Cl.
*G06F 12/02* (2006.01)

(52) U.S. Cl. ....................................... 711/112; 711/114

(58) Field of Classification Search ........................ None
See application file for complete search history.

(56) References Cited

U.S. PATENT DOCUMENTS

| | | | |
|---|---|---|---|
| 6,321,356 B1* | 11/2001 | Snodgrass et al. | 714/738 |
| 6,490,700 B1* | 12/2002 | Oshima et al. | 714/718 |
| 7,120,841 B2* | 10/2006 | Ohlhoff | 714/718 |
| 7,325,176 B2* | 1/2008 | Larson et al. | 714/718 |

FOREIGN PATENT DOCUMENTS

JP 05-257824 10/1993

\* cited by examiner

*Primary Examiner*—Hyung S Sough
*Assistant Examiner*—Ngoc V Dinh
(74) *Attorney, Agent, or Firm*—Townsend and Townsend and Crew LLP; Darren Gold (57) ABSTRACT

Embodiments of the invention provide an HDD functional test apparatus which can test an HDD in a shorter time by increasing the amount of transfer per command without using a larger memory resource. In one embodiment, a data storage device test apparatus comprises a storage section to store original data; a data generating section which generates transfer data, larger in size than the original data, for each command to a data storage device by repeatedly using the original data; and a transfer section which transfers the generated transfer data to the data storage device.

17 Claims, 8 Drawing Sheets

Test time reducing effect of comparator circuit in HDD testing ASIC

|  | Test time (Sec) |
|---|---|
| Memory transfer (496sector/command) *1 | 765 |
| Data generated in HDD testing ASIC (FFFhsector/command) *2 | 335 |
| Effect | ▲430 |

*1: 496-sector memory area was repeatedly used.
*2: Data was generated in the HDD testing ASIC without using memory.

Test condition
HDD                  :HITACHI GST 18GB FC-2GB HDD
                     (IC35L018F2DY10-0)
Interface controller :q'logic corporation ISP 2300
CPU                  :Hitachi (Renesas) SH-3 56.75MHz
Compiler             :GreenHills C Compiler
PCI bus              :64BIT/56.75MHz Fig.10 (PRIOR ART)

Fig.11 (PRIOR ART)

FUNCTIONAL TEST METHOD AND FUNCTIONAL TEST APPARATUS FOR DATA STORAGE DEVICES

CROSS-REFERENCES TO RELATED APPLICATIONS

This application claims priority from Japanese Patent Application No. JP2005-294305, filed Oct. 7, 2005, the entire disclosure of which is incorporated herein by reference.

BACKGROUND OF THE INVENTION

The present invention relates to a functional test method and functional test apparatus for data storage devices.

As known, there are a variety of data storage devices which use different types of media such as optical disks and magnetic tapes. Among them, the hard disk drive (HDD) has become so popular as to be one of the indispensable storage devices for today's computer systems. Further, not limited to computers, the hard disk drive is widening its range of application more and more due to the superior characteristics, covering moving picture recording/reproducing apparatus, car navigation systems, removable memories for digital cameras and so on.

In addition, various techniques have been developed in order to provide higher capacity and higher speed data storage devices. Adaptation to new interfaces such as SAS (Serial Attached SCSI) and FG4G (Fibre Channel 4 Gbps) is an example of what are aimed at higher speed. Development of new interfaces is causing a demand for functional test apparatus capable of testing data storage devices in accordance with these new interfaces. In addition, there has been a strong need for functional test apparatus which can test data storage devices less expensively and more quickly.

Figure 10:
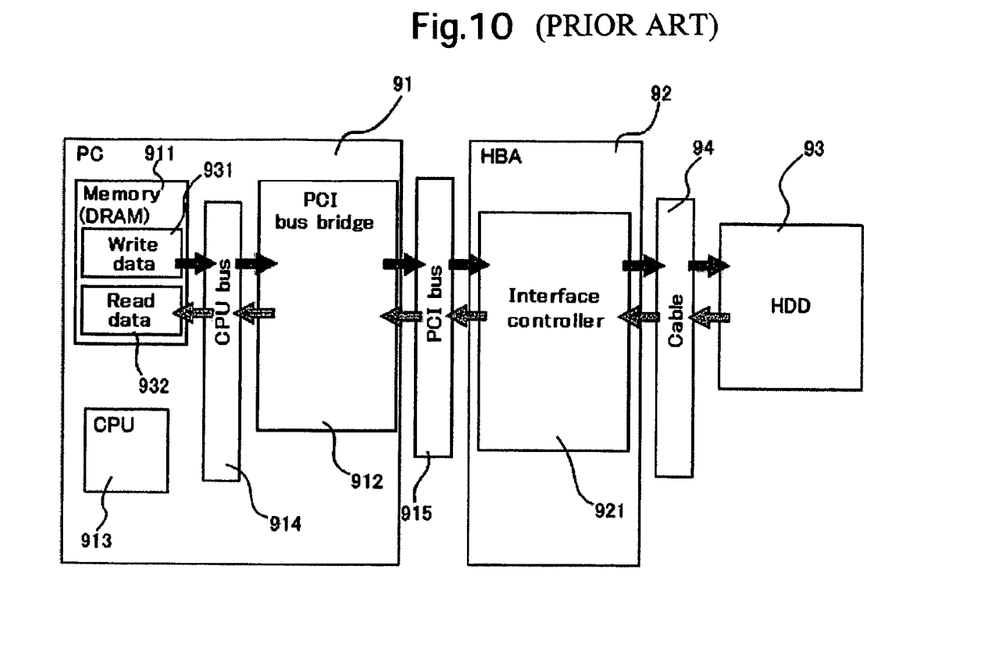
FIG. 10 shows a block diagram of a conventional HDD functional test apparatus which uses a PC.

In functional testing of data storage devices, PCs were conventionally used. Shown in FIG. 10 is a typical PC-used functional test method for an HDD. In this typical functional test of an HDD, a PC 91 and an HBA (Host Bus Adapter) 92 are used. The HBA 92 is connected with an HDD 93 by a cable 94. A memory 911, a PCI bus bridge 912 and a CPU 913 which are provided in the PC 91 are respectively connected to a CPU bus 914. In addition, the HBA 92 has an interface controller 921 provided therein.

In a functional test apparatus configured as mentioned above, functional testing of an HDD is performed as below:

1. Write data 931 is prepared in the memory 911 such as a DRAM. In addition, an area is reserved for read data 932.

2. The CPU 913 sends a write instruction to the HDD 93. Via the interface controller 921, the HDD 93 instructs the PCI bus 915 to send desired data. Then, the write data 931 in the memory 911 is sent to the interface controller 921 via the PCI bus bridge 912.

3. The interface controller 921 sends the write data 931 to the HDD 93 according to the interface of the HDD 93. The HDD 93 writes/stores the write data 931.

4. After a signal indicating that the data is written in the HDD 93 is sent from the HDD 93, the CPU 913 sends a read instruction to the HDD 93. The interface controller 921 receives the read data 932 from the HDD 93 according to the HDD interface.

5. The read data 932 from the interface controller 921 is written in the memory 911 by the PCI bus bridge 912.

6. The CPU 913 compares the write data 931 in the memory 911 with the read data 932 therein.

However, this method is costly since high performance PCs and HBAs are very expensive. Due to this problem, methods which do not use PCs and HBAs are under development. These methods use a test CPU board in place of a PC and an interface board in place of an HBA are under development.

Figure 11:
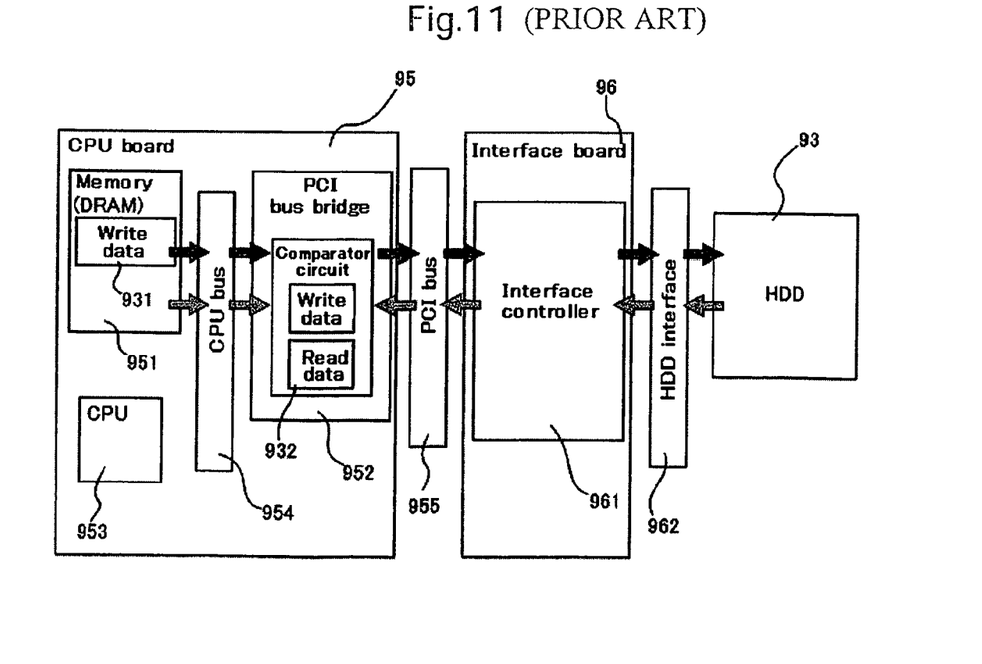
FIG. 11 shows a block diagram of a conventional HDD functional test apparatus where no PC is used.

Shown in FIG. 11 is such a functional test method for HDDs. In this functional test method, a CPU board 95 is used in place of a PC and an interface board 96 is used in place of an HBA. In the CPU board 95, a memory 951 such as a DRAM, a PCI bus bridge 952 and a CPU 953 are provided. The memory 951, the PCI bus bridge 952 and the CPU 953 are respectively connected to a CPU bus 954. In addition, the PCI bus bridge 952 has a data comparator circuit provided therein.

The interface board 96 has an interface controller 961 provided therein. The PCI bus bridge 952 in the CPU board 95 and the interface controller 961 in the interface board 96 are connected to the PCI bus 955. In addition, the interface board 96 and the HDD 93 are connected by an HDD interface 962.

In a functional test apparatus configured as mentioned above, functional testing of an HDD is performed as below:

1. Write data 931 is prepared in the memory 951 such as a DRAM.

2. The CPU 953 sends a write instruction to the HDD 93. The HDD 93 sends an instruction to the PCI bus 956 to instruct it to send desired data. Then, the write data 931 in the memory 911 is sent to the interface controller 961 via the PCI bus bridge 952.

3. The interface controller 961 sends the write data 931 to the HDD 93 according to the HDD interface 962. The HDD 93 writes/stores the write data 931.

4. The CPU 953 sends a read instruction to the HDD 93. The interface controller 961 receives the read data from the HDD 93 according to the HDD interface 962.

5. The PCI bus bridge 952 reads the write data 931 from the memory 951 and compares it with the read data from the interface controller 961.

6. The CPU 953 obtains the comparison result from the PCI bus bridge 952.

Conventionally, functional testing of a data storage device is performed by repeating a write operation to the data storage device by using write data stored in a memory until all storage areas of the storage device are inspected, as disclosed in, for example, Patent Document 1 (Japanese Patent Laid-Open No. Hei 5-257824).

In functional testing of an HDD, data transfer is usually performed between the HDD and a memory such as a DRAM. Specifically, data in the memory is written in the HDD and the written data is read out and compared with the data in the memory. However, a high speed and large capacity memory is needed to transfer large data. This makes it impossible to perform functional testing of HDDs quickly and inexpensively since providing such a high speed and large capacity memory is expensive.

BRIEF SUMMARY OF THE INVENTION

The present invention was made in order to solve the above-mentioned problem. It is a feature of the present invention to provide a high speed functional test apparatus for HDDs by increasing the amount of data to be transferred per command without using a larger memory resource.

According to an aspect of the present invention, there is provided a data storage device functional test apparatus comprising a storage section to store original data; a data generating section which generates transfer data, larger in size than the original data, for each command to a data storage device by repeatedly using the original data; and a transfer section which transfers the generated transfer data to the data storage device. Since the transfer data size per CPU command can be increased by repeatedly using the original data, it is possible to substantially reduce the time spent to test the function of a data storage device without increasing the capacity of the memory.

Preferably, the data generating section generates the transfer data by using the original data and variable data which varies depending on the address in the data storage device. In this case, since each transfer data comprises original data and variable data, different data is written to each address in the data storage device. Further preferably, as the variable data, a value associated with a specific address in the data storage device is used. Such a value may be generated by a counter. It is also preferable to generate different variable data for each sector. Here, a "sector" is the data storage device's smallest unit of storage. As the variable data, it is also preferable to use an address in the data storage device associated with the variable data.

Preferably, the above-mentioned data storage functional test apparatus is further provided with a comparator circuit. Write operation is done to an address in the data storage device and, after that, read operation is done from the address in the data storage device; a comparator circuit is further provided. By the comparator circuit, the write data which the write operation tried to write to the address is compared with the read data which is read from the address by the read operation. It is further preferable for the data generating section to generate write data which is associated with an address from which the read operation is to be done, allowing the comparator circuit to compare the read data read from the address with the write data associated with the address. It is also preferable to prepare an address to variable data association table in the storage section. In this case, write data which is associated with an address from which the read operation is to be done is generated according to this association table.

According to another aspect of the present invention, there is provided a data storage device functional test method comprising the steps of: by repeatedly using original data, generating transfer data larger in size than the original data; performing a write operation by transferring the transfer data to a data storage device; after the write operation is complete, performing a read operation from the data storage device; and comparing the read data which is read from an address with the write data which the write operation tried to write to the address.

The HDD functional test apparatus according to the present invention can reduce the test time by transferring large data without using a high speed and large capacity memory since small data stored in an HDD testing ASIC is used repeatedly.

DETAILED DESCRIPTION OF THE INVENTION

The following will provide a detailed description of a specific embodiment of the present invention with reference to the drawings. This is a functional test apparatus/method embodiment of the present invention for data storage devices. As an example of a data storage device, the present embodiment assumes an HDD. This functional test method performs error check by writing data to the whole disk surface, reading data from the disk and comparing read data with write data for each address.

To perform this functional test method, the data storage device functional test apparatus according to the present embodiment generates write data for each address to which data is to be written. Each write data is generated by using original data which is common to all addresses and variable data which varies depending on the address to which the data is to be written.

Further, the HDD functional test method according to the present embodiment can transfer larger size data than the original data by one command since write data is generated by repeatedly using original data. This makes it possible to transfer large data without needing a large memory. Since it is possible to increase the amount of data to be transferred per command, it is possible to decrease the number of commands in the functional test of an HDD and therefore drastically decrease the time spent in the functional test of the HDD.

In addition, the HDD functional test method according to the present embodiment uses a testing CPU board instead of a PC and an interface board instead of an HBA. A PCI bus bridge provides a bridge between a CPU bus to which a CPU is connected and a PCI bus to which the interface board is connected. Contained in an HDD testing ASIC (Application Specific Integrated Circuits), the PCI bus bridge implements the HDD functional test method according to the present invention. Use of the HDD testing ASIC to integrate the PCI bus bridge therein makes it possible to add new functions to the PCI bus bridge without mounting additional chips.

Figure 1:
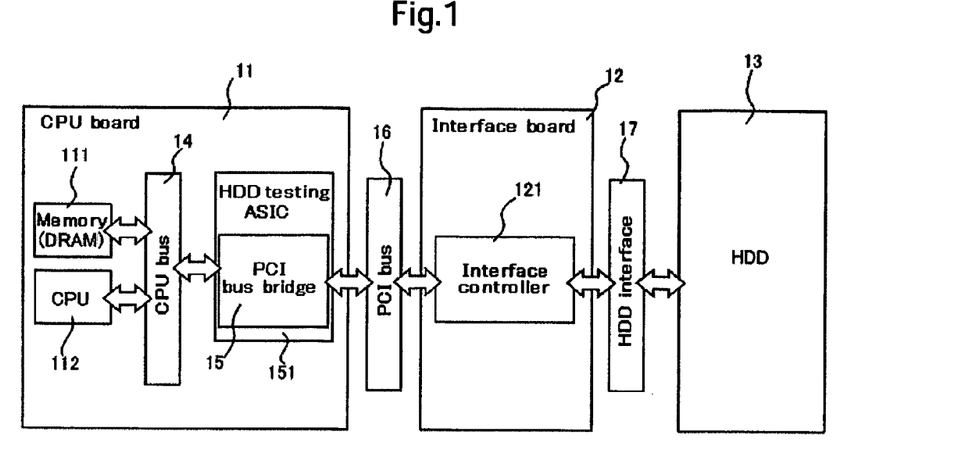
FIG. 1 is a block diagram of an HDD functional test apparatus configured according to an embodiment of the invention.

Firstly, the following describes how data and signals are sent and received within each of the CPU board, the interface board and the HDD. FIG. 1 shows a block diagram of an HDD functional test apparatus configured according to the present embodiment. A CPU board 11 has a memory 111 such as a DRAM and a CPU 112 provided therein. The memory 111 and the CPU 112 are connected by a CPU bus 14. In addition, a PCI bus 16 exists between the CPU board 11 and an interface board 12. Further, a PCI bus bridge 15 is provided as a bridge between the CPU bus 14 and the PCI bus 16. This PCI bus bridge 15 is implemented by an HDD testing ASIC 151.

An interface board 12 has an interface controller 121 provided therein. This interface controller 121 is connected to the PCI bus bridge 15 in the CPU board 11 via the PCI bus 16. In addition, an HDD interface 17 is disposed between the interface board 12 and an HDD 13.

In the HDD functional test according to the present embodiment, the CPU 112 initially sends a write command to the HDD 13 via the CPU bus 14, the PCI bus bridge 15, the PCI bus 16 and the interface board 12. Upon getting ready to write the data which is to be sent following the write command, the HDD 13 sends a signal to the HDD testing ASIC 151 via the interface board 12 to indicate that it is ready to receive the write data for performing a write operation.

When the write command, issued from the CPU 112 to the HDD 13, goes through the PCI bridge 15, it is received by the HDD testing ASIC 151. When a signal indicating the HDD 13 is ready to receive write data is sent from the HDD 13, the HDD testing ASIC 151 transfers the write data. This write data is created in the HDD testing ASIC 151 and transferred through the PCI bus 16 to the HDD 13 for write therein. When the transferred data reaches the amount of data to be transferred per command, the HDD 13 sends a signal to the CPU 112 to indicate that the data is sent. By repeating this, write is done to the whole disk surface in the HDD 13.

After write to the whole disk surface in the HDD 13 is completed, disk read operation is performed. The CPU 112 initially sends a read command to the HDD 13 via the CPU bus 14, the PCI bus bridge 15, the PCI bus 16 and the interface board 12. Data, read in the HDD 13, is sent to the HDD testing ASIC 151 via the interface board 12 and the PCI bus 16. In the HDD testing ASIC 151, error check is performed through data comparison for each read address. If an error is detected, the address which caused the error is stored in the buffer in the HDD testing ASIC 151.

Figure 2:
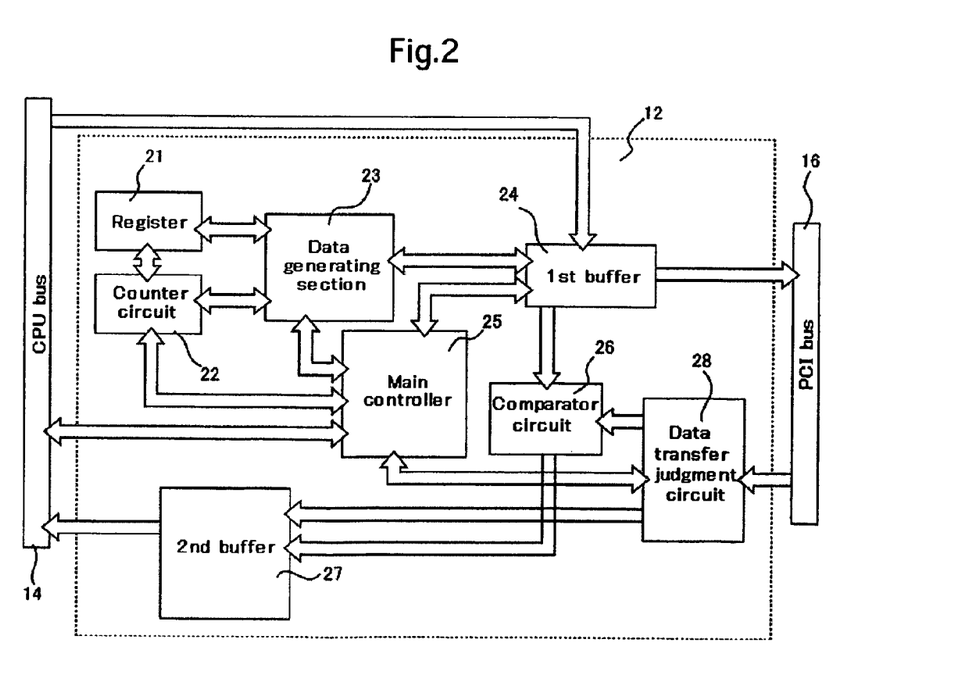
FIG. 2 is a detailed block diagram of the HDD testing ASIC.
Figure 3:
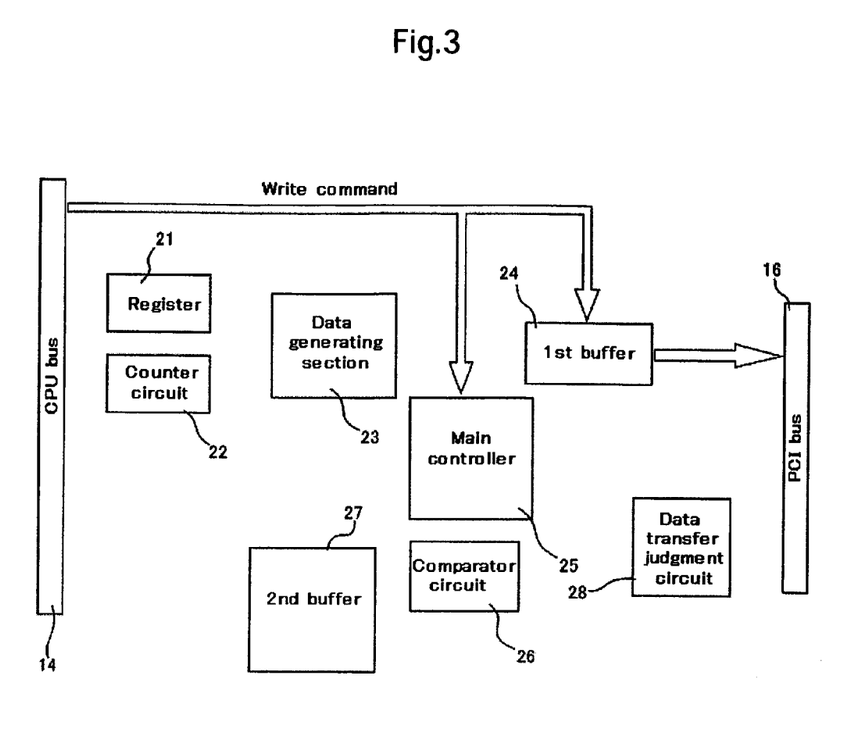
FIG. 3 is a first schematic diagram showing signal flows in the HDD testing ASIC.
Figure 4:
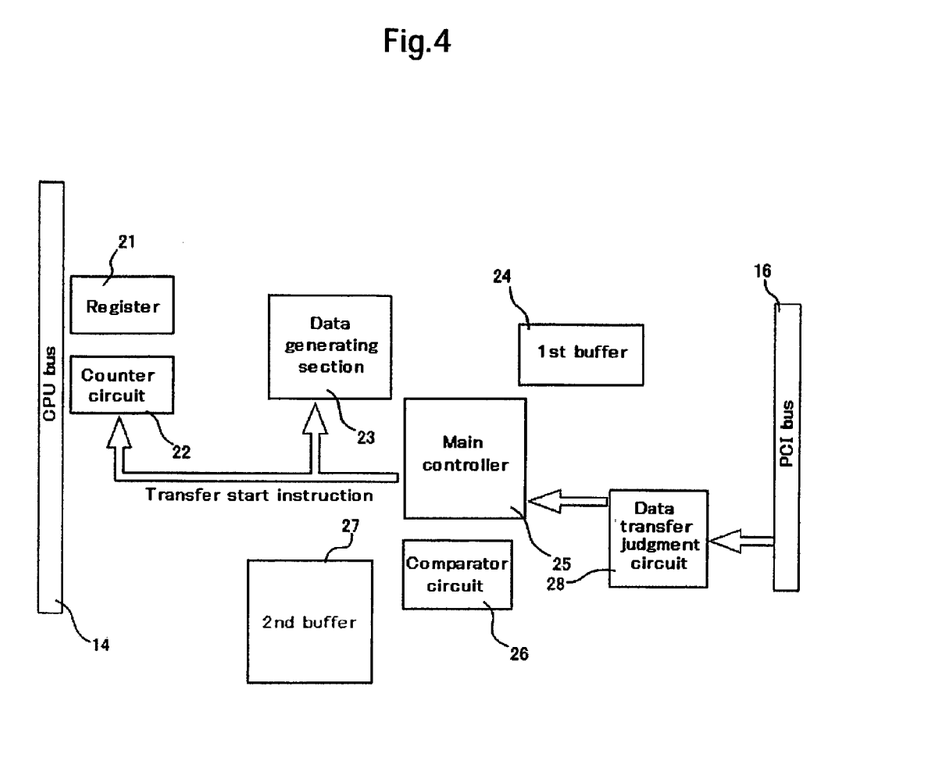
FIG. 4 is a second schematic diagram showing signal flows in the HDD testing ASIC.

FIG. 2 shows a detailed block diagram of the HDD testing ASIC 151. In FIG. 2, the PCI bus bridge 15 containing the HDD testing circuit is shown with the CPU bus 14 and the PCI bus 16. In the HDD testing ASIC 151, there are provided: a register 21 which stores original data; a counter circuit 22 which generates a counter value; a data generating section 23 which generates write data by using a counter value from the counter circuit 22 and original data from the register 21; a first buffer 24 which temporally stores write data generated by the data generating section 23 and a command entered via the CPU bus 14 and sends them as timed by the PCI bus clock; and a main controller 25 which controls data transmission and reception timings in the HDD testing ASIC 151.

Further, the HDD testing ASIC contains: a comparator circuit 26 which compares write data having been put under write operation with the corresponding read data read from the HDD; a second buffer 27 which stores a comparison result from the comparator circuit 26; a data transfer judgment circuit 28 which transfers data from the PCI bus 16 to the comparator circuit 26 or the second buffer 27. To which of them the data from the PCI bus is to be transferred by the data transfer judgment circuit 28 is controlled by the main controller 25 in the HDD testing ASIC 151.

In the HDD functional test method according to the present invention, the data generating section 23 generates write data by using variable data which is disk address-dependent and original data which is stored in the data generating section 23. Preferably in the HDD functional test method according to the present invention, a counter value from the counter circuit 22 is used as variable data. This is because a counter value is associated one by one with write data and a disk address at which the write data is written.

Further preferably, write data is written at the same disk address as the counter value since this eliminates the necessity of storing the counter value to disk address associations in the memory. Also preferably, the size of each write data is made equal to the amount of data per sector since this makes it easy to associate addresses with counter values.

In the HDD functional test method according to the present embodiment, the data generating section 23 repeatedly generates one write data for transmission to the HDD 13 each time a write command is executed. In addition to original data which is fixed, each write data contains variable data which varies depending on the counter value. Thus, different data can be written at each address. In addition, this makes it possible for the main controller to control the amount of data to be transferred per command.

FIGS. 3, 4, 5, 6, 7 and 8 schematically show how the above-mentioned apparatus performs functional testing of the HDD 13. In functional testing of the HDD 13, a write command from the CPU 112 is sent to the HDD 13 via the CPU bus 14, the first buffer 24 in the PCI bus bridge 15 (HDD testing ASIC 151), the PCI bus 16 and the interface board 12. The write command is also sent to the main controller 25 (see FIG. 3). Upon getting ready to write data which is to be sent following the write command, the HDD 13 sends a signal to the main controller 25 in the HDD testing ASIC 151 to indicate that it is ready to receive the write data (see FIG. 4).

Receiving the signal sent from the HDD 13 to indicate that it is ready to receive write data, the main controller 25 sends a data generation start signal to the data generating section 23. The data generating section 23 reads a write data amount from the register 21 and a counter value from the counter circuit 22. After the counter value is fetched by the data generating section 23, the counter circuit 22 increments the counter value by 1. The data generating section 23 generates write data by using the original data having been stored therein via the CPU bus 14 and the counter value from the counter circuit 22 (see FIG. 5).

Figure 5:
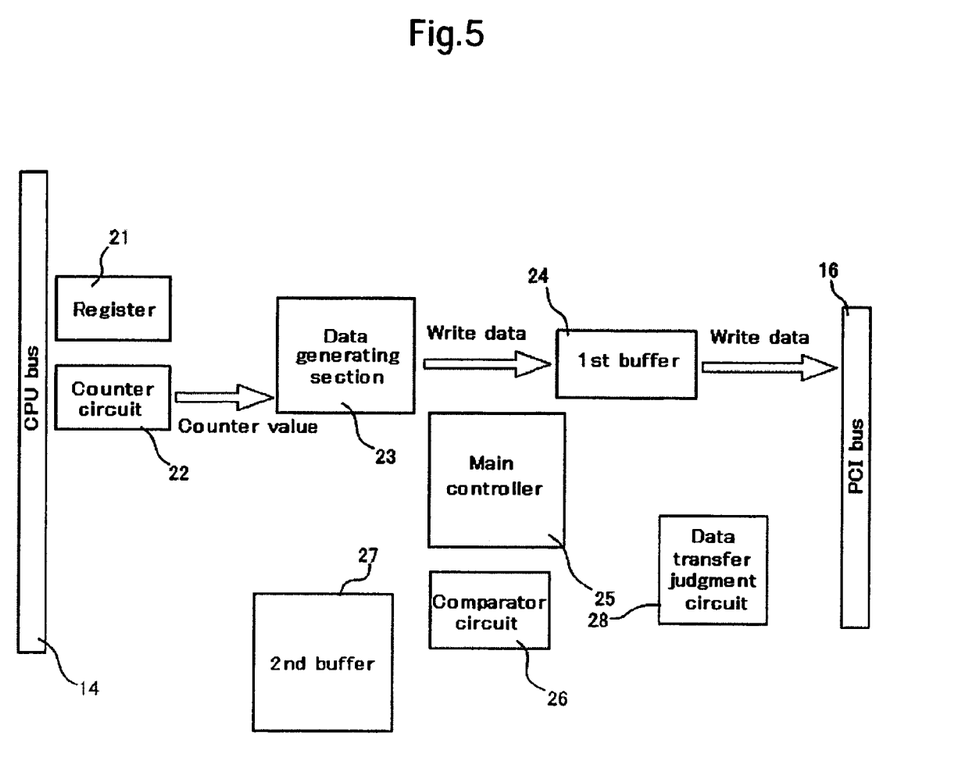
FIG. 5 is a third schematic diagram showing signal flows in the HDD testing ASIC.

The generated write data is stored in the buffer 24 and sent to the PCI bus 16 by the PCI bus clock. This action is repeated until the amount of transferred data reaches the data amount given from the main controller 25. A counter value to write address association table is created in advance by the main controller 25 and stored in an internal memory thereof. Alternatively, this association table may be stored in a memory which is prepared separately from the main controller 25 and the register 21. This memory must not be too large since the association table does not contain much data. In addition, this association table is not necessary if the counter value is taken as the disk address to which the write data is to be written.

Figure 6:
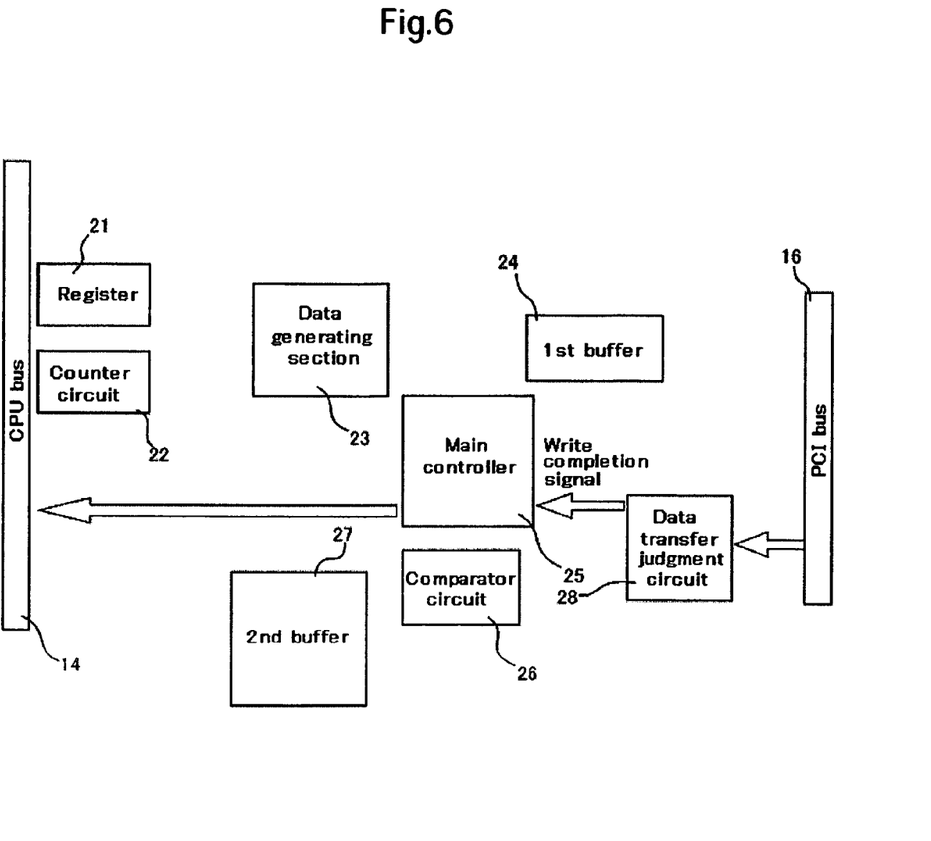
FIG. 6 is a fourth schematic diagram showing signal flows in the HDD testing ASIC.
Figure 7:
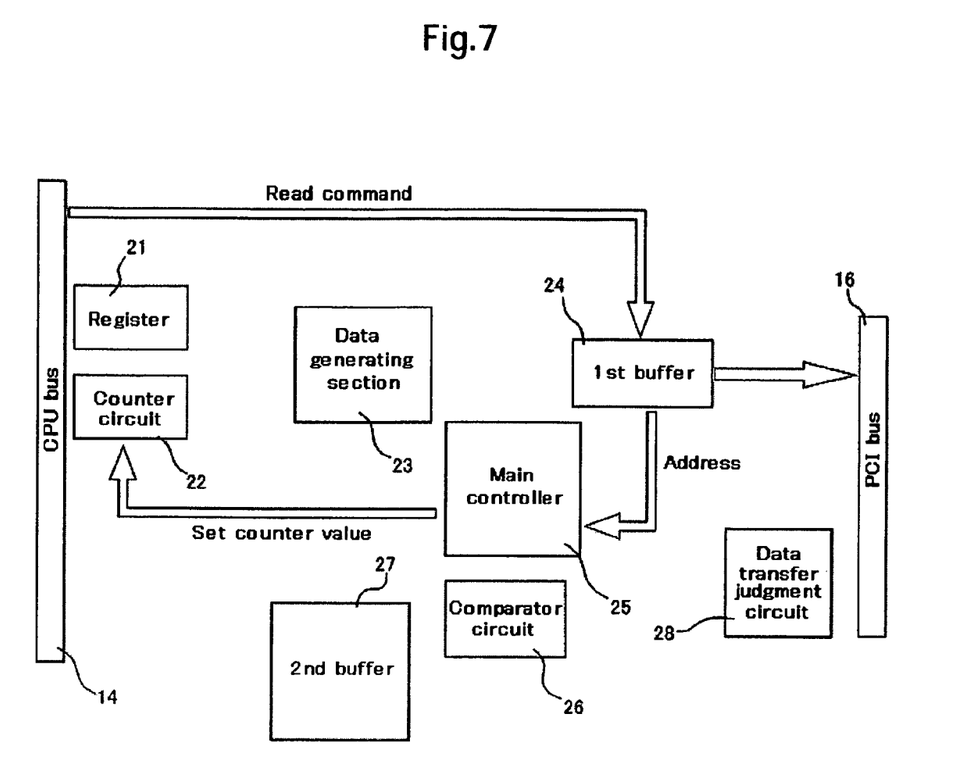
FIG. 7 is a fifth schematic diagram showing signal flows in the HDD testing ASIC.

When the above-described write operation is done to the whole disk surface of the HDD 13, a write completion signal is issued from the HDD 13 (see FIG. 6). After write operation is complete, read operation is performed. At first, the CPU 112 sends a read command to the HDD 13 via the CPU bus 14, the first buffer 24, the PCI bus 15 and the interface board 12 (see FIG. 7).

Then, the main controller 25 sends a data generation start signal to the data generating section 23. The data generating section 23 reads a data transfer amount from the register 21 and a counter value from the counter circuit 22. Then, the data generating section 23 fetches the original data to generate write data which was written to the address from which data is being read (see FIG. 8).

Figure 8:
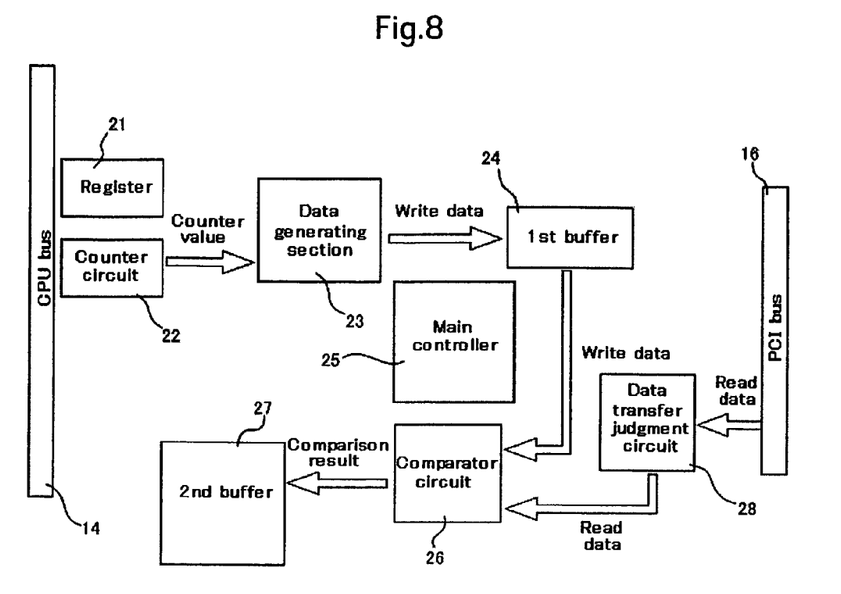
FIG. 8 is a sixth schematic diagram showing signal flows in the HDD testing ASIC.

The data generating section 23 sends this generated write data to the first buffer 24. The first buffer 24 sends this generated write data to the comparator circuit 26 by the PCI bus clock. Also, the data read from the HDD 13 is sent through the interface board 12 to the PCI bus 16. The PCI address for the read data sent to the PCI bus 16 is sent to the data transfer judgment circuit 28. The data transfer judgment circuit 28 determines to which of the comparator circuit 26 and the second buffer 27 the data is to be transferred. According to the judgment result, the data from the PCI bus 16 is transferred to the comparator circuit 26. Thus, the data read from the HDD 13 is sent to the comparator circuit 26 by the data transfer judgment circuit 28.

The write data from the first buffer 24 and the read data from the data transfer judgment circuit 28 are entered into the comparator circuit 26. The comparator circuit 26 compared the entered read data with the entered write data. If the comparison result shows no difference, HDD functional testing for this address is complete since the addressed location is normal in the HDD 13. On the other hand, if there is a difference between the read data and the write data, the read data for this address is sent to the second buffer 27 and stored therein since the addressed location in the HDD 13 is defective. Alternatively, this data may be sent from the second buffer 27 to the memory 111 via the CPU bus 14. From this data registered at the memory 111, an alternate sector may be prepared for use when the defective address is tried to be accessed for read or write.

Figure 9:
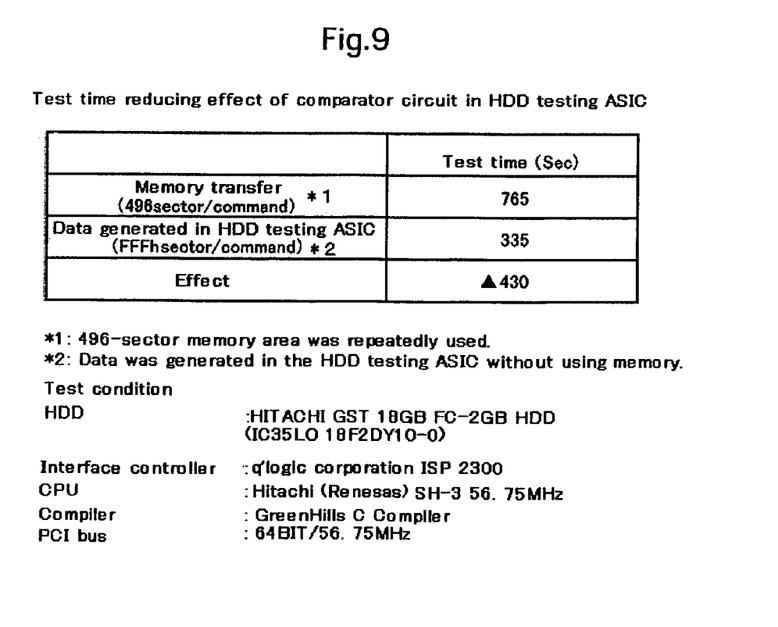
FIG. 9 is a test time comparison table for the HDD functional test apparatus according to the embodiment of the invention.

A table in FIG. 9 shows test results. The tested HDD was HITACHI GST 18GB FC-2GB HDD (IC35L018F2DY10-0). This HDD was tested by using q'logic Corporation ISP 2300 as the interface controller, HITACHI (Renesas) SH-3 56.75 MHz as the CPU, GreenHills C Compiler and a 64BIT/56.75 MHz PCI bus.

In the left column of the FIG. 9 table, test conditions are shown. In the right column of the table, test times spent are shown. In one case, memory was used to transfer data. In the other case, data was generated in the HDD testing ASIC. In the case of memory transfer, 496 sectors were transferred per command. In the latter case where FFFFh sectors were transferred per command, data was generated in the HDD testing ASIC according to the present invention. In the "Effect" row, the result of the memory transfer-based test is compared with the result of the test according to the present invention.

As shown in FIG. 9, the test time can be reduced to about a half as compared with the memory transfer-based test.

As mentioned above, since the memory and buffer provided in the HDD testing ASIC are not required to store more than the counter value to address association table, this method uses only a very small memory area. By increasing the amount of data transferred per command, it is therefore possible to realize an HDD functional test which can be performed quickly by using a small memory resource.

Note that the present invention is not limited to the above-mentioned embodiment. Needless to say, various changes may be made thereunto without departing from the spirit of the present invention. For example, although the above-described embodiment assumes an HDD, the present invention is applicable to other data storage devices. Further, although read operation is performed after write operation is completed for the whole disk surface in the above-mentioned HDD function test, write operation and read operation may be done consecutively for each predetermined area.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage device test apparatus comprising:
   a storage section to store original data;
   a data generating section which generates transfer data, larger in size than the original data, for each command to a data storage device by repeatedly using the original data; and
   a transfer section which transfers the generated transfer data to the data storage device;
   wherein the data generating section generates the transfer data by using the original data and variable data which varies depending on a destination address in the data storage device.

2. The data storage device functional test apparatus according to claim 1 wherein the variable data is a counter value which is associated with the address in the data storage device and a counter to generate the counter value is further provided.

3. The data storage device functional test apparatus according to claim 1 wherein the variable data is changed for each sector of the data storage device.

4. The data storage device functional test apparatus according to claim 1 wherein as the variable data, an address in the data storage device associated with the variable data is used.

5. The data storage device functional test apparatus according to claim 1 wherein:
   write operation is done to an address in the data storage device and, subsequently, read operation is done from the address in the data storage device;
   a comparator circuit is further provided; and
   by the comparator circuit, a write data which the write operation tried to write to the address is compared with the read data which is read from the address by a read operation.

6. The data storage device functional test apparatus according to claim 1 wherein the data generating section generates write data which is associated with an address from which the read operation is to be done and a comparator circuit compares a write data read from the address with a write data associated with the address.

7. The data storage device functional test apparatus according to claim 6 wherein:
   an address to variable data association table is provided in the storage section; and
   write data which is associated with an address from which the read operation is to be done is generated according to the association table.

8. A data storage device functional test method comprising:
   generating transfer data larger in size than an original data by repeatedly using the original data;
   performing a write operation by transferring the transfer data to a data storage device;
   performing a read operation from the data storage device after the write operation is complete; and
   comparing a write data which is read from an address with a write data which the write operation tried to write to the address;
   wherein the transfer data is generated by using the original data and variable data which varies depending on a destination address in the data storage device.

9. The data storage device functional test method according to claim 8 wherein the variable data is generated by a counter.

10. The data storage device functional test method according to claim 8 wherein as the variable data, an address in the data storage device associated with the variable data is used.

11. The data storage device functional test method according to claim 8 wherein the variable data is changed for each sector of the data storage device.

12. The data storage device functional test method according to claim 8 further comprising:
   generating write data which is associated with an address from which the read operation is to be done; and comparing the read data read from the address with the write data associated with the address.

13. The data storage device functional test method according to claim 12 further comprising:
   providing an address to a variable data association table; and
   generating write data which is associated with an address from which the read operation is to be done according to the association table.

14. A computer-implemented data storage device functional test apparatus including a memory and processor, the apparatus comprising:
   means for generating transfer data larger in size than an original data by repeatedly using the original data;
   means for performing a write operation by transferring the transfer data to a data storage device;
   means for performing a read operation from the data storage device after the write operation is complete; and
   means for comparing a write data which is read from an address with a write data which the write operation tried to write to the address;
   wherein the means for generating generates the transfer data by using the original data and variable data which varies depending on a destination address in the data storage device.

15. The data storage device functional test apparatus according to claim 14 wherein the variable data is a counter value which is associated with an address in the data storage device and a counter to generate the counter value is further provided.

16. The data storage device functional test apparatus according to claim 14 wherein the variable data is changed for each sector of the data storage device.

17. The data storage device functional test apparatus according to claim 14 wherein as the variable data, an address in the data storage device associated with the variable data is used.

* * * * *